United States Patent

Glausch et al.

[11] Patent Number: 5,749,946
[45] Date of Patent: May 12, 1998

[54] ANTICORROSIVE PIGMENT PREPARATION CONTAINING METAL OXIDE-COATED PLATELET ADJUVANT

[75] Inventors: Ralf Glausch, Darmstadt; Georg Reinhard, Dresden; Renate Jircik, Dresden; Ursula Rammelt, Dresden, all of Germany

[73] Assignee: Merck Patent Gesellschaft Mit Beschrankter Haftung, Germany

[21] Appl. No.: 642,267

[22] Filed: May 3, 1996

[51] Int. Cl.⁶ .................................................. C04B 9/02
[52] U.S. Cl. ...................... 106/14.17; 106/14.14; 106/410; 106/411; 106/413; 106/415; 106/417
[58] Field of Search ........................ 106/14.17, 14.14, 106/417, 415, 410, 411, 413

[56] References Cited

U.S. PATENT DOCUMENTS 4,792,358  12/1988  Kimura et al. .................. 106/415
5,244,649   9/1993  Ostertag et al. ................ 106/415
5,439,957   8/1995  Takimoto et al. ............. 106/14.14

FOREIGN PATENT DOCUMENTS 281417    9/1990   German Dem. Rep.
90/13605  11/1990  WIPO

OTHER PUBLICATIONS

Abstract of DE 44 11 568.7 Oct. 1995.

*Primary Examiner*—Mark L. Bell
*Assistant Examiner*—Scott L. Hertzog
*Attorney, Agent, or Firm*—Millen, White, Zelano & Branigan, P.C.

[57] ABSTRACT

A pigment preparation comprising
(i) 10–80% by wt. of a platelet-shaped substrate coated with a metal oxide, and
(ii) 20–90% by wt. of an active pigment.

13 Claims, No Drawings

5,749,946

ANTICORROSIVE PIGMENT PREPARATION CONTAINING METAL OXIDE-COATED PLATELET ADJUVANT

BACKGROUND OF THE INVENTION

The invention relates to pigment preparations which are free from lead compounds, chromate compounds and toxic organic compounds and are intended for the formulation of coating materials, especially anti-corrosion primer coating materials.

In the protection of metallic articles against corrosion by means of organic coatings, the primer is accorded, as is known, particular importance. Its primary function is to ensure thorough and energetically stable adhesion on the metal substrate, especially under the action of moist atmospheres or water. Furthermore, its permeability to water and oxygen should be minimal, and finally it should be highly suitable as a substrate for subsequent coatings.

Whereas the development of the adhesive bond with the metal surface to be protected, and the linking reactions of the primer with a subsequently applied organic coating, can be regulated principally by the choice of the so-called film former (organic binder) in cooperation with appropriate film-forming auxiliaries (e.g., catalysts for the polymer film crosslinking), the permeation properties of coats are also affected substantially by the introduction of pigments It is particularly advantageous to use typical barrier pigments, whose lump or platelet structure means that they are incorporated so favorably into the organic coating that they result in a significant enlargement of the diffusion paths and, consequently, a sharp reduction in the permeability. A precondition for the optimum expression of this effect is, of course, that the pigment/binder interactions are sufficiently stable to water.

Good anti-corrosion primers contain not only barrier pigments but also materials known in the art as "active" pigments, which are intended not to display their action until local defects penetrating through to the metal substrate have formed in the coating. At such time, the active pigments, through various means (e.g., electrochemical action, or conversion of corrosion products or hydroxyl ions into slightly soluble precipitates, exerting a "plugging" action) exert an anticorrosive effect on the coated substance. Prior to this, they are likewise to contribute to the barrier effect, or should at least not reduce the effect brought about by barrier pigments.

The way in which and the extent to which an active pigment reacts in such local defects in the case of penetration of corrosive aqueous media and can ultimately bring about a "healing" of the defect depends naturally on a large number of parameters. Examples include the size of the defect, the nature of the pigment, the pigment volume concentration (p.v.c.) and the composition of the corrosive medium which has penetrated into the defect.

In zinc-rich primers, for example, the zinc particles act as sacrificial anode. In addition, relatively insoluble corrosion products of the zinc are produced, which are deposited as solid compounds in defects of coatings on steels and plug these defects.

Red lead and zinc chromate, on the other hand, are strong oxidizing agents and have a passivating effect on exposed metal surfaces within coatings in the presence of water. The reaction products, finally, lead to the formation of relatively insoluble compounds (metal soaps) which plug defects in organic coats and, furthermore, chemisorptively bind corrosion-promoting ions from adjacent aqueous media (e.g. sulphate and chloride).

The use of zinc-rich primers is associated with various disadvantages. It requires an extremely high p.v.c. in terms of zinc, which is very costly. In addition, the action of zinc as a sacrificial anode is guaranteed only at normal temperature in respect of certain ferrous materials. In warmer waters ($\leq 60°$ C.) the potential is reversed, resulting then in more severe corrosion, as a consequence of local element formation, of the steel substrate exposed in defects of a coating. A further disadvantage is that the zinc particles themselves have a tendency to corrosion if the coating has absorbed moisture. The gaseous hydrogen which is produced in this case can destroy the coating mechanically and by this means can even promote the onward penetration of corrosive media down to the metal substrate to be protected.

The use of lead compounds and chromate compounds as pigments in coating materials is no longer permitted, since these are classified as toxic and carcinogenic. Among the alternative active pigments proposed to date the list has been topped by various solid zinc compounds of relatively low solubility, such as zinc phosphate, zinc borate or zinc gluconate. Zinc phosphate in particular is being applied to an increasing extent. It cannot of course exert any electrochemical effect. As already stated, the activity of zinc phosphate pigments in anti-corrosion primers is based principally on the fact that it converts the corrosion products of ferrous material substrates, which products are initially formed under the action of an aggressive aqueous medium in defects of the organic coating, into solid, virtually insoluble compounds, for example into basic Fe(III)-zinc phosphates, which lead in turn to the plugging of the defects. Unlike the active pigments mentioned above, therefore, the action of the zinc phosphate is directed at the preceding corrosion of the metal substrate to be protected in defect sites of the organic coating at the pore base. As expected, therefore, the anti-corrision effect of the zinc phosphate is usually far less than that of zinc chromate or red lead and, moreover, is heavily dependent on the composition of the aqueous medium in the defect. The same applies in principle to all other active pigments whose mechanism of action, like that of zinc phosphate, consists in the reactive transformation of primary corrosion products of the relevant metal substrate, with the formation of solid salts or complex compounds, in local defects of an organic coating, examples being zinc borate or zinc gluconate.

In order to compensate for this disadvantage it has been proposed to formulate the pigment volume concentration of such active pigments at much higher levels than was the case for zinc chromate with earlier coating formulations, and, moreover, to employ particularly finely disperse pigment powders, in order to achieve uniform distribution within the coating (U.S. Pat. No. 4,243,707). Since, however, the pigments concerned are to a limited extent soluble in water, and this tendency to dissolve increases markedly when there is a sharp reduction in the particle size, the coatings formulated therewith, as their pigment volume concentration increases, show an increasing tendency towards osmotically stimulated swelling. This results in turn in a relatively rapid delamination of the coating from the metal substrate over a large area, with the consequence of reduced anti-corrosion properties (Progr. in Org. Coatings 18 (1990) 123). In the case of pigments such as zinc phosphate and zinc borate, an additional factor is that they may contain different amounts of water of hydration. In order to prepare them in finely disperse form, they must be dried more intensively, and they then contain only a low amount of water of hydration. The zinc phosphate pigment, for example, is then in the form of the dihydrate $Zn_3(PO_4)_2 \cdot 2\,H_2O$. When coatings pigmented with this pigment are exposed to water, there exists an affinity for conversion into the tetrahydrate, which likewise promotes the swelling of the coating and reduces its anti-corrosion properties. Similar effects are known for zinc borates as well. Effects of this kind, of course, occur all the more the higher the chosen volume concentration of such pigments. In order to limit these effects sufficiently, the starting point for other proposals is to formulate the p.v.c. of such pigments only to approximately the level which was customary for zinc chromate in earlier coating formulations, but to employ these pigments in a form in which they are surface-modified with a second substance or contain said substance as an additional component. Although the surface-modification of pigments having a low proportion of water of hydration with organic or inorganic coverings is able effectively to counter the abovementioned incorporation of further water of hydration, this does not necessarily lead to an improvement in the activity of the pigment. Methods which have proven to be better than this include combinations of an active pigment with a further solid component, which supports the process of conversion of the primary corrosion products into a virtually insoluble compound, for example by establishing a favorable pH in the defect of the organic coating. Mention may be made here, by way of example, of combinations of zinc phosphate/zinc borate (U.S. Pat. No. 3,829,395), zinc phosphate/zinc molybdate, zinc phosphate/zinc oxide, zinc phosphate/aluminium phosphate (or polyphosphate) and barium metaborate/zinc oxide. For improving the action of zinc phosphate, DD 245 892 proposes the incorporation into the coating material of from 8 to 16% of a mixture comprising 30 to 70% natural calcite and 70 to 30% synthetic calcium carbonate, since in this way it is intended to ensure that in defects of the coating on steel, if water penetrates, the pH is favorable for the formation of Zn—Fe phosphates and basic carbonates. The anti-corrosion properties of primers which are achieved with such pigment combinations, however, are less than with the use of the classic active pigments red lead or zinc chromate, especially in the case of exposure in chloride-containing media. Moreover, the use of calcium carbonate carries with the risk that the swellability of coatings will be increased. Finally, the hydrolysis of this filler may result in the aqueous medium within the coating adopting a pH of around 12, whereby its deadhesion (delamination) is promoted and the anti-corrosion effect is lost relatively quickly.

For the formulation of water-dilutable polymer dispersions as anti-corrosion primer coating materials, in comparison with the solvent-containing binders, it must additionally be borne in mind that pigments of marked solubility in water can impair the stability of the dispersion. Above certain system-specific ion concentrations, indeed, coagulation in the container may occur, rendering the coating material unusable. Similar effects are to be expected if pigments force a change in the pH of the polymer dispersion.

The action of the active pigments, which like the phosphates, borates, molybdates, gluconates, etc. aim to bring about the conversion of primary corrosion products into solid compounds which plug the defects of an organic coating, is intensified, as expected, when they are combined with an oxidizing agent. Sufficiently strong oxidizing agents, such indeed as red lead or chromates, then passivate the metal substrate which is exposed in defects of an organic coating, so that the, further pigment, such as phosphate, borate or molybdate, has only to convert the Fe(III) ions, which are produced in small quantities in the case of passive steel substrates.

Since the lead compounds and chromate compounds can no longer be applied, it has been proposed to employ zinc phosphates or zinc borates in combination with organic nitro compounds, especially their relatively insoluble zinc salts. Products of this kind are still customary in commerce today (SICORINE; BASF). These nitro compounds are weaker oxidizing agents than, for example, the chromates and accelerate the corrosion of the metal substrate exposed in pores of a coating, for example in accordance with

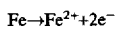
$$Fe \rightarrow Fe^{2+} + 2e^-$$

and, in doing so, are themselves reduced, for example in accordance with:

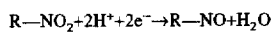
$$R-NO_2 + 2H^+ + 2e^- \rightarrow R-NO + H_2O$$

By this means it is true that the corrosion products of the metal substrate to be protected are available relatively rapidly and sufficiently for the formation of solid compounds which plug the defects of an organic coating, and it is on this phenomenon that the relatively good anti-corrosion effect of zinc phosphate or zinc borate pigments mobilized in this way appears to be based. Under recent increasingly strict environmental legislation, however, these organic nitro compounds and probably to an even greater extent the resulting reduction products (nitroso compounds) must be classified as toxologically objectionable, so that the active pigments modified in this way cannot be accepted as a true alternative for the substitution of toxic chromates.

German Patent Application P 44 11 568.7 (EP 675173) describes a pigment preparation for anti-corrosion coating materials which comprises a chelate-forming compound, a plateletlike material and a material which binds hydroxide ions. This pigment preparation can in addition comprise a plateletlike conductive pigment. The protective coatings on ferrous materials which are produced with the pigment preparation provide better protection against corrosion than protective coatings comprising chromate pigments. Given the choice of an appropriate binder, these protective coatings can also be employed for other corroding metals for the purpose of effective protection against corrosion under atmospheric exposure and in aerated aqueous media. The pigment preparation is not, however, suitable for waterborne coating materials.

There is therefore a need for pigment combinations which are free from lead compounds, chromate compounds and toxic organic compounds and which, when used in primer coats on metals susceptible to corrision, show an anti-corrosion effect which at least matches that of lead and chromate pigments.

SUMMARY OF THE INVENTION

An object of the invention is to provide a pigment preparation which can be incorporated both into coating formulations based on customary binders and into waterborne coating materials and, as a primer on a vary wide variety of metal substrates, especially on surfaces of ferrous materials, possesses anti-corrosion properties which are comparable with the protective effect of lead-containing and chromate pigments. This pigment preparation should possess pronounced anti-corrosion properties not only under atmospheric exposure but also in aerated aqueous media.

This object is achieved, in accordance with the present invention, by a pigment preparation comprising:

(i) 10–80% by mass (i.e., by weight), preferably 30–60% by mass, of a plateletlike support material, e.g., of high electrical resistance and pronounced chemical resistance, which is coated with a metal oxide, and (ii) 20–90% by mass, preferably 40–80% by mass, of an active pigment.

The term "plateletlike support material coated with metal oxide", includes mixtures of support materials coated with different metal oxides.

The plateletlike (i.e., platelet-shaped) support materials used are natural or synthetic mica and other phyllosilicates, such as talc, kaolin, sericite or else glass platelets.

Preferred plateletlike support materials are mica and plateletlike pigments prepared in accordance with the international application PCT/EP92/02 351. They consist of a transparent, inorganic plateletlike matrix, preferably silicon dioxide. The matrix is produced by solidifying a liquid precursor on a continuous belt. Additional constituents may also be incorporated into this matrix.

The plateletlike support materials typically have thickness of between 0.05 and 5 µm and, in particular, between 0.2 and 2 µm. Their extent in the two other dimensions is between 1 and 250 µm and, in particular, between 5 and 60 µm. The ratio of the extent in the principal dimension to the thickness (aspect ratio) is more than 3 and preferably more than 5.

The plateletlike support materials can be coated with, e.g., $TiO_2$, $Fe_2O_3$, $Cr_2O_3$, $ZrO_2$, $SiO_2$, $Al_2O_3$ and ZnO.

The metal oxide layers are preferably applied by a wet-chemical method, in which context it is possible to employ the wet-chemical coating method developed for the preparation of pearl luster pigments; such methods are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or else in further patent documents and other publications.

Suitable plateletlike support materials coated with metal oxide are pearl luster pigments based on mica, which are commercially available under the designation "Iriodin®" (product of E. Merck, Darmstadt).

The oxide covering adhering firmly to the plateletlike, chemically inert support material, preferably mica, is resistant to contact with aqueous media in the range $2 \leq pH \leq 12$ and forms only amphoteric surface hydroxyl groups which are characterized by an isoelectric point $pH_{iso} < 5$. Pigment particles of this kind can be suspended well and uniformly in organic binders comprising polymers having appropriate functional groups, such as carboxyl and alkenyl C—C double bonds. In this context they enter into acid-base interactions with the polymers of the binder, one consequence of which is the development of a preferential orientation of the solid constituents within the fluid mixed phase. This has a beneficial effect on the uniformity of the distribution of further pigments and additives in the coating material and becomes all the more intense as, in the course of film formation on substrates, solvent evaporates from the initially still wet coat.

The preferential orientation of the polymer-containing particles within organic film-formers which is brought about, in accordance with the invention, by the oxide-covered solid pigments creates, ultimately, particularly advantageous preconditions for the uniform, energy-intensive adhesion of the coatings produced therewith on metal substrates and for the crosslinking of the functional polymers of the binder with one another to form a cohesive coat of extremely low structural porosity, giving rise overall to coatings with a notably high barrier effect.

The specific electrical resistance $R_{SP}$ (Ω·cm) of the plateletlike support material coated with a metal oxide should preferably be greater than or equal to $10^8$ (Ω·cm) at 250° C.

The values measured on compressed powder moldings, using the capacitor discharge method and the four-point method at 25° C., gave for Iriodin 9504 (pearl luster pigment, manufacturer: E. Merck) a mean of $2.3 \cdot 10^{10}$ Ω·cm and for Iriodin 9103 a mean of $5.5 \cdot 10^{11}$ Ω·cm.

The term "active pigment" refers to compounds having electrochemical activity and to compounds which are capable of converting the primary corrosion products which form in defects of an organic coating into a solid, water-stable compound or by bonding hydroxyl ions and forming slightly soluble compounds and, in doing so, of ensuring that the defects are plugged, while the anti-corrosion properties of the coating are retained.

Examples of the latter kind of active pigment are zinc phosphate, zinc borate and calcium metaphosphate.

Examples of the former kind of active pigment are those acting as catalysts for oxygen reduction, e.g., monomeric and/or polymeric, metal-free or metal-containing, chelate complex compounds according to the general formulae I and II:

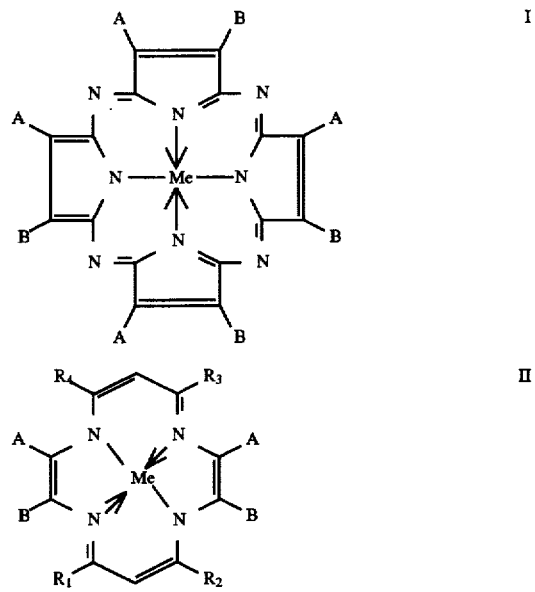

in which

A and B each independently of one another are an aromatic or cycloaliphatic radical which can also contain heteroatoms, such as S, Se, O and N, and aryl, alkyl, halogen, oxygen-containing, sulfur-containing or nitrogen-containing groups as additional substituents, $R^1$, $R^2$, $R^3$ and $R^4$ are H atoms or alkyl radicals, and Me is Fe, Ni, Co, Mn, Bi, Sn, Zn or $H_2$.

These chelate complex compounds exert a passivating effect on the metal surface.

As chelate complex compounds it is preferred to employ phthalocyanines, tetraarylporphyrins and tetraazaannulenes. Among the phthalocyanines, metal phthalocyanines and, in particular, iron phthalocyanine are preferred.

The problem of the higher preparation costs entailed by the metal phthalocyanine can be countered by applying this active component to conductive support materials, such as surface-modified mica and/or graphite, and thus achieving the desired objective with much less of the actual active substance, metal phthalocyanine, with an equal or even greater anti-corrosion effect.

Examples of materials which bind hydroxide ions include metaphosphates, bi- and triphosphates, silica gels, silicates, aluminosilicates, calcite and all relatively insoluble metal salts which form relatively insoluble basic salts or complex compounds with OH$^-$ ions. For example, Ca[SiO$_3$] picks-up hydroxide ions to form Ca$_3$(OH)$_2$[Si$_4$O$_{10}$].

It is also possible to use those compounds which at their surface form a buffer system which fixes the pH of the adjacent, aqueous medium in the range 6≦pH≦8.5, which is considered as being without danger for the delamination of organic coatings on steel substrates:

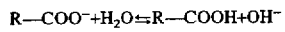

Preference is given to the use of calcium metaphosphate, which binds the hydroxide ions which form during the reduction of the oxygen.

According to the invention, it is also possible to employ mixtures of the active pigments described above.

The pigment preparation according to the invention is produced from the individual components using the machinery and methods which are customary in the pigments and coatings industry and is dispersed in coating formulations based on customary binders. It is also possible, however, for the individual components in succession to be dispersed in the binder.

For incorporating the oxide-covered plateletlike pigments, the methods to be used should not lead to the destruction of these particles, for example their breakup by grinding. It has been found appropriate to select these oxide-covered plateletlike pigments in a particle size fraction which is favorable for the consistency of the coating material concerned and then to incorporate the pigments into the coating material by means of dispersants.

The binders employed are preferably alkyd resins, polyurethanes, chlorinated rubber or melamine resins, which are present in the coating formulations in a quantity of from 35 to 55% by mass.

The selection of the binders requires the carrying out of optimization studies, although this is customary to the art. It is necessary to ensure that a sufficient amount of the oxygen dissolved in the electrolyte of the defect of a coating is reduced, in the so-called 4-electron step, to form OH$^-$ ions and to "buffer" again these OH ions which are formed. If only a relatively small amount of dissolved oxygen is available and it is reduced only in accordance with a two-electron step, for example in accordance with:

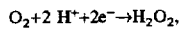

then it does not act as a passivator but merely promotes the anodic breakdown of the metal substrate.

An excessive concentration of inert substances, for instance the auxiliaries required in the specific system, can also be a hindrance, since it counters the adequate after-supply of oxygen (incipient diffusion), or the amount of Ca—MP available locally is too little to buffer the OH$^-$ ions.

The concomitant effect of dissolved oxygen as passivator is necessary in practice with all of the examples indicated when the intention is for the said activity to take place in defects of the relevant coating. This also applies primarily to the coatings pigmented with zinc phosphate or zinc borate, even though in that case a "plugging process" may also be present as a result of various precipitation reactions.

Pigment preparations according to the invention, containing a catalyst, for example iron phthalocyanine, have the advantage that catalysis of the abovementioned four-electron step even in the presence of relatively little dissolved oxygen ensures reliable passivation of the metal surface.

The abovementioned additives and substances which are required for the specific system must in no way always be admixed to a coating formulation, but are only used if they improve the utility properties and processing properties of the coating material. Examples of the additives and substances required for specific systems are inert substances such as blanc fixe, talc or mica. However, they are not active pigments per se, even if they naturally, as a result of their dispersive interactions with the other pigments, ensure the fine dispersion of these pigments and counter agglomeration.

The pigment preparation according to the invention is preferably present in the coating materials in concentrations of from 10 to 45% by mass.

The pigment preparation according to the invention is produced from the individual components using the machines which are customary in the pigments and coatings industry, such as sand mills or bead mills, ball mills and roll mills, in which they are milled to a fineness corresponding to what is usual practice, and are dispersed in coating formulations based on customary binders. It is also possible, however, for the individual components in succession to be dispersed in a conventional binder. Such binders include alkyd resins, polyurethanes, chlorinated rubber or melamine resins, which are preferably present in the coating formulations in a quantity of from 35 to 55% by mass.

Further constituents, in a quantity of up to 2% by mass, are siccatives and auxiliaries, for example dispersants, levelling agents, anti-settling agents, adhesives or thixotropic agents. Also present are solvents, in a proportion preferably of from 10 to 20% by mass, which must be matched—in a manner customer to the art—to the respective binder. Customary solvents include butyl acetate, xylene and mixtures of paraffinic hydrocarbons in the boiling range from 120° to 180° C.

The functional groups with affinity for water of the polymers of the organic binders concerned are bound, as a result of the acid-base interactions, with the oxide-covered solid pigment particles present in accordance with the invention, and crosslinking reactions are promoted as a result. Accordingly, the films produced therewith have a much smaller tendency to absorb water (swelling) when, in the cured state, they come into contact with aqueous media, and to allow its diffusion or permeation down to the metal substrate, than coating materials which do not contain the plateletlike additive according to the invention. Finally, this is true even if the coating material comprises active pigments with affinity for water, such as zinc phosphate, zinc borate or calcium metaphosphate, for example. The addition according to the invention of an oxide-covered solid pigment, in fact, ensures that such active pigments are embedded into the coating in uniform, fine distribution and not in sizeable particle agglomerates, without any loss in their activity. This activity is in fact promoted, since the organic coatings comprising an addition according to the invention are, on the one hand, more densely packed and, on the other hand, possess a greater strength of adhesion to the metal substrate. This ensures that the breakdown reactions which occur in such a film under the influence of aggressive aqueous media lead only to defects of relatively small dimension, from which the active pigment is not washed out. Finally, if local film breakdown has advanced down to the metal substrate, the persisting high strength of adhesion of the coating in the adjacent regions prevents the start of underfilm corrosion (in the case of ferrous materials: underrusting).

The corrosion of the metal substrate exposed over a relatively small area at the pore base of such a defect can under these conditions apparently be inhibited effectively and rapidly by the active pigment present in the electrolyte-filled defect, as evidenced by the results of corrosion tests carried out accordingly. In this case there is no need for the concomitant effect of an oxidizing agent, which promotes the formation of a solid compound in the defect of the organic coating either by stimulating the corrosion of the exposed metal substrate or by passivating it. The simultaneous existence of such an effect, however, is in no way detrimental to the anti-corrosion effect which can be achieved.

If the pigment preparation according to the invention contains as active pigment a chelate-forming compound and a material which binds hydroxide ions, in accordance with German Patent Application 44 11 568.7, by means of which the atmospheric oxygen which is present in the aqueous medium around defects of the organic coating to passivate the metal substrate which is exposed at the pore base, then these defect sites "heal" particularly quickly and the anti-corrosion properties of the coating remain safeguarded completely thereafter.

It has already been emphasized that the activity of the oxide-covered plateletlike pigments used in accordance with the invention in anti-corrosion primers is attributable primarily to the acid-base properties of the surface hydroxyl groups present on the oxide coating, which action is documented in isoelectric points $pH_{iso} < 5$. The basis for this is the so-called hard-soft principle (HSAP) which goes back to Pearson (cf. e.g.: Acid-Base Interactions: Relevance to Adhesion Science and Technology (Ed. by K. L. Mittal and H. R. Anderson, junior), VSP Utrecht, The Netherlands 1991, 25 pp.), according to which strong Lewis acids, for example the functional groups —MeOH$_2^+$ which are present on oxide surfaces below $pH_{iso}$, enter preferentially into interactions with strong Lewis bases, for instance the carboxyl-containing polymer particles of an organic binder. Weak Lewis acids, on the other hand, interact primarily with weak Lewis bases, an example of such interaction is the adsorption of resin particles containing vinyl groups, via the alkenyl C—C double bond (π-electron system as weak base) on oxide-free surfaces of transition metals (weak acid).

For the affinity $A_R$ ($=-\Delta_R G°$) of the former interactions, the relationship $$A_R = 2,303 \ RT \ (pK_b - pH_{iso})$$

has already been substantiated theoretically (at 25° C.: $A_R = 5.7$ ($pK_b - pH_{iso}$) in kJ/mol) (cf. e.g.: Interface Conversion for Polymer Coatings (Ed. by P. Weiss and G. D. Cheever) Elsevier Ltd. New York 1968, pp. 3–60). Accordingly, $A_R$ is larger the greater the difference between the isoelectric point of the oxide, $pH_{iso}$, and the negative decimal logarithm of the dissociation constant $K_b$ of the relevant base ($pK_b$ value).

The pigments employed in accordance with the invention having the tradename Iriodin® 103 or 9103 WR consisting of 42% TiO$_2$ (rutile) on mica, have $pH_{iso}=(4.7\pm0.2)$, while those designated Iriodin® 504 or 9504 WR consisting of 46% Fe$_2$O$_3$ (haematite) on mica, even have $pH_{iso}=(3.6\pm0.2)$. Consequently, owing to the $pH_{iso} < 5$, they bring with them substantially better preconditions for energy-intensive interactions with strong Lewis basis, for instance the carboxyl-containing polymer particles, than the relevant oxide powders. For example, the $pH_{iso}$ (isoelectric point, i.e.p., approximately identical with the point of zero charge, p.z.c.) in the case of TiO$_2$ (rutile) powder is always $\geq 5.8$, and in the case of the Fe(III) oxide powders is even $\geq 6.5$ (cf. e.g.: Chem. Rev. 65 (1965) p. 177 ff. and Progr. in Org. Coatings 19 (1991) p. 227 ff.). In coatings produced with coating materials whose pigment combination comprised Fe$_2$O$_3$ powder (e.g., iron oxide red Bayferrox 140) and/or TiO$_2$ powder (white pigment) in addition to an active pigment such as zinc phosphate or zinc borate, the effect according to the invention did not occur and the anti-corrosion properties found were in every case poorer than those achieved with pigmentation using red lead or zinc chromate.

The Fe$_2$O$_3$ deposited on plateletlike support material, such as mica, unlike all oxide powders containing Fe(III) ions, is not electrochemically reducible. Consequently it cannot function cathodically, for example in accordance with

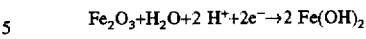
$$Fe_2O_3 + H_2O + 2\ H^+ + 2e^- \rightarrow 2\ Fe(OH)_2$$

and cause corrosion at the Fe metal, for example in accordance with

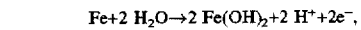
$$Fe + 2\ H_2O \rightarrow 2\ Fe(OH)_2 + 2\ H^+ + 2e^-,$$

giving the overall reaction

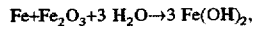
$$Fe + Fe_2O_3 + 3\ H_2O \rightarrow 3\ Fe(OH)_2,$$

which has been shown actually to take place.

Herein lies a further advantage of the application, in accordance with the invention, of iron oxide-coated plateletlike pigments in anti-corrosion primers.

The improvement in the anti-corrosion properties of primers containing active pigment, which can be achieved with oxide-covered plateletlike pigments, especially on surfaces of ferrous materials, is in no way limited only to their use in nonaqueous coating materials which are formulated on the basis of organic solvents, but is also obtained appropriately in waterborne coating materials, especially since these pigments have complete chemical resistance in the pH range $4.0 \leq pH \leq 9.0$ which is typical of waterborne coating materials. Consequently, using pigment preparations according to the invention, the anti-corrosion properties of primer coating materials which have been formulated with water-dilutable polymer dispersions is also considerably improved, especially when employed for ferrous materials.

In an aqueous coating system no interactions between the polymer coating and the pigment particles and cross-linking take place because the components are present in a micelle structure. However, after removing of water in forming the protective layer, these reactions can take place as in the case of an organic coating system, again reducing delamination.

The pigment preparations according to the invention are employed for coating formulations which are applied as primer to a wide variety of metal substrates, especially to ferrous materials. Once formation of the film is complete, the primer is distinguished under atmospheric exposure or exposure to aerated aqueous media by pronounced anti-corrosion properties.

The pigment preparations according to the invention meet all of the requirements which are placed on pigments for anti-corrosion primers.

They impair neither the levelling or the film-forming properties of the coating material and, instead, lead to uniform coatings which have a high barrier effect, resist ageing and adhere particularly firmly to metal substrates; in addition, they do not restrict the overcoatability of the resulting primer for the construction of multicoat systems and, in particular, are able to counter the diffusion and permeation of aqueous media into the organic coating and to protect the metal substrate against corrosion in pores or defects of the coating, by causing the rapid deposition of relatively insoluble compounds and thereby plugging the defect sites. It is also ensured thereby that underfilm corrosion does not occur and that the anti-corrosion properties of the organic coating overall are maintained.

A further advantage of the pigment preparations according to the invention is that they can be used in coating formulations based on water-dilutable polymer dispersions as well, without putting the stability of these waterborne coating systems at risk.

Pigment preparations according to the invention were incorporated into various binder systems, the particle size being below 20 μm. By means of the diluents appropriate for the respective binder, and in the case of the waterborne coating material by the addition of a thickener as well, the coating materials containing the pigment preparations according to the invention achieved the necessary processing viscosity. In this way, five coating materials were prepared and were used to coat metal sample panels consisting of a tonnage steel after thorough surface pretreatment (mechanical grinding, degreasing with an aqueous/organic cleaning agent, rinsing, drying). These sample panels with comparable film thicknesses (60±5 μm) were subjected to the following tests, during which they were compared with in each case one commercially customary reference system, including a coating containing zinc chromate:

a) Outdoor weathering in accordance with DIN 53166
b) MACHU test, alternating exposure after 8 h immersion in a solution comprising 50 g of NaCl, 10 ml of glacial acetic acid and 5 g of 30% hydrogen peroxide solution per liter of water (fresh daily) at 40° C. and 16 h exposure in dry air at room temperature per cycle
c) Alternating climate test in accordance with VDA [German Carmakers' Association] 621-415

Results of the anti-corrosion tests a) Outdoor weathering in accordance with DIN 53166

Following an outdoor storage period of 12 months, the slit which was made is surrounded, in the case of the samples coated by the reference systems I, II and III, to an extent of from 2 to 3 mm wide by numerous small blisters, whereas with the coatings of Examples 1 and 2, which comprise the pigment preparations according to the invention, only a few small isolated blisters have appeared in the direct vicinity of the slit. On the samples with the pigment combination of Example 3 according to the invention, no blistering at all can be observed after 12 months.

In the case of the samples coated with a waterborne coating system, outdoor weathering was terminated after 6 months since reference system IV not only was showing distinct blistering but also had a number of rust penetration sites. Evaluation of the degree of blistering of the coating in accordance with DIN 53209 and of the proportionate corroded area, based on the overall area after detachment of the coating, gave the following average result:

| Coating | Blistering | Proportion of area corroded in % |
|---|---|---|
| Reference system IV | $m^4/g^4$ | about 75 |
| Example 4 | $m^1/g^1$ | about 20 | b) MACHU test

In the case of the coatings produced with a solvent-containing coating material, the samples were evaluated after exposure for 8 cycles. The parameters determined were, again, the degree of blistering of the coatings in accordance with DIN 53209 and the proportionate corroded area, based on the overall area of the metal sample panels following detachment of the coating:

| Coating | Blistering | Proportion of area corroded in % |
|---|---|---|
| Reference system I | $m^3/g^3$ | 42 |
| Reference system II | $m^4/g^4$ | 60 |
| Reference system III | $m^3/g^3$ | 38 |
| Example 1 | $m^1/g^1$ | about 5 |
| Example 2 | $m^1/g^1$ | about 8 |
| Example 3 | 0/0 | <1 |

The coatings produced with a waterborne coating material were assessed after only 3 cycles:

| Coating | Blistering | Proportion of area corroded in % |
|---|---|---|
| Reference system IV | $m^4/g^4$ | about 60 |
| Example 4 | $m^1/g^1$ | about 10 | c) Alternating climate test in accordance with VDA 621-415

After 9 cycles of alternating climate exposure, the reference systems I, II and III exhibit under-rusting at the slit which at some points has progressed up to 3 mm, whereas on the Examples 1, 2 and 3 coated in accordance with the invention this process can at this stage not clearly be ascertained (<1 mm).

The samples coated with a waterborne coating material were assessed after 6 cycles. In this evaluation, the coating of the reference system IV were found to have not only under-rusting at the slit which had progressed to about 4 mm but also initial dotlike corrosion penetrations. With the coatings prepared according to Example 4, the under-rusting extending from the slit was minimal (<1 mm), but the degree of blistering of the coatings was graded on average as $m^2/g^2$.

The results show that the protective coats produced on surfaces of ferrous materials with the pigment preparations according to the invention, in comparison to the reference system, bring about a markedly better protection against corrosion, despite the fact that reference system II contains a highly effective chromate pigment.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 195 16 580.2, filed May 5, 1995, are hereby incorporated by reference.

EXAMPLES

% by mass

Example 1

Zinc phosphate     7.41

| | |
|---|---|
| Zinc white (zinc oxide) | 11.97 |
| Iriodin ® 9504 WR | 10.82 |
| Microtalc N | 6.38 |
| Blanc fixe | 6.37 |
| Resin solution 60% in xylene (air- and heat-drying short-oil alkyd resin) | 42.85 |
| Solvent | 12.9 |
| Siccatives and auxiliaries | 1.3 |
| Example 2 | |
| Zinc borate | 11.22 |
| Iriodin ® 9103 WR | 16.6 |
| Microtalc N | 6.32 |
| Blanc fixe | 5.28 |
| Resin solution Plexigum PM 685 (acrylic resin in xylene) | 42.72 |
| Solvent | 16.45 |
| Siccatives and auxiliaries | 1.51 |
| Example 3 | |
| Iron phthalocyanine | 6.45 |
| Ca metaphosphate | 12.8 |
| Zinc phosphate | 7.22 |
| Iriodin ® 9504 WR | 9.9 |
| Resin solution as in Example 1 | 47.6 |
| Solvent | 14.6 |
| Siccatives and auxiliaries | 1.43 |
| Example 4 | |
| Zinc phosphate | 7.24 |
| Iriodin ® 9504 WR | 10.5 |
| Microtalc AT extra | 6.37 |
| Blanc fixe micro | 6.1 |
| Zinc white | 7.44 |
| Water-dilutable polymer dispersion as binder, consisting of a finely dispersed carboxyl-containing styrene-butadiene-copolymer with anionic emulsifier, solids content 50% pH 8.5 | 52.7 |
| Nitrite-containing corrosion inhibitor | 2.5 |
| Butylglycol | 2.5 |
| Antifoam, wetting agent, thickener | 4.65 |
| Comparison Example 1 | |
| Zinc phosphate | 7.20 |
| Zinc white (oxide) | 11.63 |
| Microtalc N | 6.19 |
| Bayferrox 140 (red iron oxide) | 13.36 |
| Blanc fixe | 6.19 |
| Resin solution as in Example 1 | 41.64 |
| Solvent | 12.50 |
| Siccatives and auxiliaries | 1.29 |
| Comparison Example 2 | |
| Zinc yellow (zinc chromate) | 7.63 |
| Zinc white | 11.63 |
| Microtalc AT 1 | 6.19 |
| Bayferrox 140 | 13.36 |
| Blanc fixe | 6.19 |
| Resin solution as in Example 1 | 41.21 |
| Solvent | 12.50 |
| Siccative and auxiliaries | 1.29 |
| Comparison Example 3 | |
| Zinc borate | 12.2 |
| Microtalc N | 6.7 |
| Bayferrox 140 | 12.5 |
| Blanc fixe | 7.7 |
| Resin solution as in Example 2 | 42.8 |
| Solvent | 16.5 |
| Siccative and auxiliaries | 1.6 |
| Comparison Example 4 | |
| Zinc phosphate | 7.0 |
| Microtalc AT extra | 6.0 |
| Bayferrox 140 | 8.0 |
| Blanc fixe | 12.0 |
| Water-dilutable polymer dispersion as binder as in Example 4 | 56.3 |
| Nitrite-containing corrosion inhibitor | 2.5 |
| Butylglycol | 3.0 |
| Antifoam, wetting agent, thickener | 5.2 |
| Example 5 | |
| Iron phthalocyanine | 6.30 |
| Ca metaphosphate | 11.25 |
| Zinc phosphate | 6.25 |
| Iriodin ® 9504 WR | 10.25 |
| Blanc fixe micro | 6.2 |
| Water-dilutable polymer dispersion as in Example 4 | 50.8 |
| Nitrite-containing corrosion inhibitor | 2.0 |
| Butylglycol | 2.7 |
| Antifoam, wetting agent, thickener | 4.25 |

| Coating | Blistering | Proportion of area corroded in % |
|---|---|---|
| a) Outdoor weathering in accordance with DIN 53166 after 6 months: | | |
| Example 5 | $m^1/g^1$ | about 5 |
| b) MACHU test after 3 cycles: | | |
| Example 5 | $m^1/g^1$ | <5 |
| c) VDA 621-415 after 6 cycles: | | |
| Example 5 | $m^1/g^1$ | <1 mm |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pigment preparation comprising an organic binder containing (i) 10–80% by wt. of a platelet-shaped substrate coated with a metal oxide, and (ii) 20–90% by wt. of an active pigment.

2. A pigment preparation according to claim 1, wherein the platelet-shaped substrate coated with a metal oxide is mica coated with titanium dioxide or iron oxide.

3. A pigment preparation according to claim 1, wherein the active pigment is a compound which is capable of converting primary corrosion products which form in defects of an organic coating into solid compounds which are stable to water.

4. A pigment preparation according to claim 1, wherein the active pigment is a material which binds hydroxide ions.

5. A pigment preparation according to claim 1, wherein the active pigment is zinc phosphate, zinc borate or calcium metaphosphate.

6. A pigment preparation according to claim 1, wherein the active pigment is a monomeric and/or polymeric, metal-free or metal-containing, chelate complex compound of formulae I or II:

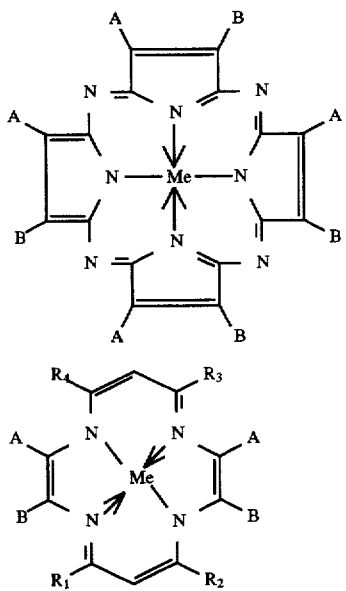

wherein

A and B are each independently an aromatic or cycloaliphatic radical which optionally contain heteroatoms and is optionally substituted by aryl, alkyl, halogen, oxygen-containing, sulfur-containing or nitrogen-containing groups, $R^1$, $R^2$ $R^3$ and $R^4$ are H atoms or alkyl radicals, and Me is Fe, Ni, Co, Mn, Bi, Sn, Zn or $H_2$.

7. A pigment preparation according to claim 1, wherein the active pigment is a phthalocyanine, tetraarylporphyrin or a tetraazaannulene.

8. A pigment preparation according to claim 1, wherein the active pigment is a metaphosphate, bi- or triphosphate, silica gel, silicate, aluminosilicate or calcite.

9. A pigment preparation according to claim 1, wherein the organic binder has carboxyl group-containing polymer particles.

10. An anti-corrosion coating material comprising a pigment preparation according to claim 1.

11. An anti-corrosion coating material according to claim 10, containing a water-dilutable polymer dispersion.

12. An anti-corrosion coating material according to claim 10, containing an organic polymer dispersion.

13. A pigment preparation comprising an organic binder containing:

(a) an active pigment; and (b) a platelet-shaped substrate coated with a metal oxide in an amount effective to increase corrosion resistance of the active pigment.

* * * * *